United States Patent
Larson et al.

(10) Patent No.: US 10,725,983 B2
(45) Date of Patent: Jul. 28, 2020

(54) SYSTEMS AND METHODS FOR DATABASE MANAGEMENT USING APPEND-ONLY STORAGE DEVICES

(71) Applicant: Huawei Technologies Co., Ltd., Shenzhen (CN)

(72) Inventors: Per-Ake Larson, Etobicoke (CA); Alexandre Depoutovitch, Toronto (CA)

(73) Assignee: Huawei Technologies Co., Ltd., Shenzhen (CN)

(*) Notice: Subject to any disclaimer, the term of this patent is extended or adjusted under 35 U.S.C. 154(b) by 250 days.

(21) Appl. No.: 15/858,960

(22) Filed: Dec. 29, 2017

(65) Prior Publication Data
US 2019/0205437 A1    Jul. 4, 2019

(51) Int. Cl.
G06F 17/00    (2019.01)
G06F 16/215   (2019.01)
G06F 3/06     (2006.01)
G06F 16/27    (2019.01)
G06F 16/18    (2019.01)
G06F 12/02    (2006.01)

(52) U.S. Cl.
CPC ........... *G06F 16/215* (2019.01); *G06F 3/06* (2013.01); *G06F 12/0276* (2013.01); *G06F 16/1805* (2019.01); *G06F 16/27* (2019.01)

(58) Field of Classification Search
CPC ..... G06F 16/215; G06F 16/27; H04F 16/1805
USPC .................................................. 707/600–899
See application file for complete search history.

(56) References Cited

U.S. PATENT DOCUMENTS

| 9,514,007 B2 | 12/2016 | Gupta et al. |
| 2010/0262633 A1 | 10/2010 | Bhattacharjee et al. |
| 2011/0173395 A1 | 7/2011 | Bhattacharjee et al. |
| 2012/0323854 A1* | 12/2012 | Schreter ............. G06F 11/1461 707/650 |

FOREIGN PATENT DOCUMENTS

| CN | 103514095 A | 1/2014 |
| CN | 105117415 A | 12/2015 |

OTHER PUBLICATIONS

Gupta et al., Amazon Aurora Deep Dive, Percona Live Data Performance Conference, Apr. 2016, Santa Clara, California.
Amazon Aurora on Amazon RDS, Retrieved from https://docs.aws.amazon.com/AmazonRDS/latest/UserGuide/rds-ug.pdf#CHAP_Aurora on Feb. 1, 2018.

* cited by examiner

*Primary Examiner* — Isaac M Woo
(74) *Attorney, Agent, or Firm* — Slater Matsil, LLP (57) ABSTRACT

An apparatus is disclosed. The apparatus may be implemented in a database node or a storage node and includes one or more processors and memory storing instructions for causing the processor to perform a number of operations. Responsive to a page write request, the apparatus determines an identifier corresponding to the requested page, sends component blocks corresponding to the page to a storage node for appending to an append-only storage log of the storage node, receives the physical location of the stored component blocks, and associates the physical storage location of the stored component blocks with the logical identifier corresponding to the page.

23 Claims, 7 Drawing Sheets

SYSTEMS AND METHODS FOR DATABASE MANAGEMENT USING APPEND-ONLY STORAGE DEVICES

FIELD

The present application relates to database management, and in particular to database management in append-only storage systems.

BACKGROUND

Computing devices are growing increasingly ubiquitous. As such, an increasing amount of data is being consumed and stored by users. Data is stored on physical computer-readable storage media as an organized collection of data, commonly referred to as a database. Databases are often used to store data that can be made accessible to users. One common type of database is a relational database, in which a number of tables are linked by relationships between the stored data entries. In some databases, unique keys are used to identify rows within some of these tables.

Conventional databases typically employ an "update-in-place" process for updating records in a database. When a record in the database is modified, an update-in-place process will typically overwrite the physical block of the storage device holding the previous record with the updated version of that record. The update-in-place process works well with legacy storage devices (e.g. Hard Disk Drives (HDDs)). Append-only storage devices (e.g. Solid State Drives (SSDs)) offer a number of advantages over legacy HDDs, including improved read and write speed performance and reduced power consumption. Consequently, modern data centres are increasingly incorporating append-only storage devices. Append-only storage devices, however, are not well-suited for use with legacy database systems.

SUMMARY

In accordance with one aspect of the invention, there is provided an apparatus comprising: one or more processors; a memory storing processor-executable instructions that, when executed by the one or more processors, cause the one or more processors to: receive a page write request relating to one or more component blocks of a page; determine, by a log writer, a logical identifier corresponding to the page in a log directory; send, by the log writer, each corresponding component block of the one or more component blocks to a storage node for appending to an append-only storage log of the storage node; receive, from the storage node, a physical storage location of each component block of the one or more component blocks; and associate, in the log directory, the physical storage location of each of the one or more component blocks with the logical identifier corresponding to the page.

In any of the preceding embodiments, the processor-executable instructions further cause the one or more processors to: receive a page read request relating to a page; determine, by the log directory, a physical storage location of one or more component blocks of the requested page in a storage node; retrieve, by a page reader, the one or more component blocks of the requested page from the storage node based on the physical storage location of the one or more component blocks; and return the requested page.

In any of the preceding embodiments, the one or more component blocks of the requested page comprise at least two component blocks, and returning the requested page comprises reconstructing, by the page reader, the requested page from the at least two retrieved component blocks.

In any of the preceding embodiments, the processor-executable instructions further cause the one or more processors to: send, by the log writer, the reconstructed page to the storage node for appending to the append-only storage log of the storage node.

In any of the preceding embodiments, the at least two component blocks are retrieved in parallel from the storage node.

In any of the preceding embodiments, the component blocks include one or more of a complete page and a page delta.

In any of the preceding embodiments, the storage node is remote from the database node.

In any of the preceding embodiments, the storage node is local to the database node.

In any of the preceding embodiments, the apparatus is integrated into one of the database node and the storage node.

In any of the preceding embodiments, the processor-executable instructions further cause the one or more processors to: collect, by a log cleaner, at least one live data block from a segment of the append-only storage log; and send the at least one live data block to the storage node for appending to an end of the append-only storage log.

In any of the preceding embodiments, the at least one live data block comprises at least two live data blocks, and sending the at least one live data block to the storage node for appending comprises reconstructing a live page from the at least two live data blocks and sending the reconstructed live page to the storage node.

In any of the preceding embodiments, the processor-executable instructions further cause the one or more processors to: instruct the storage node to clear the segment of the append-only storage log.

According to another aspect of the invention, there is provided a method comprising: receiving, at a database node, a page write request relating to one or more component blocks of a page; determining a logical identifier corresponding to the page in a log directory; sending each corresponding component block of the one or more component blocks to a storage node for appending to an append-only storage log of the storage node; receiving, from the storage node, data indicative of a physical storage location of each component block of the one or more component blocks; associating, in the log directory, the physical storage location of each of the one or more component blocks with the logical identifier corresponding to the page.

In any of the preceding embodiments, the method further comprises: responsive to receiving, at the database node, a page read request relating to a page: determining, by the log directory, a physical storage location of one or more component blocks of the requested page in a storage node; retrieving the one or more component blocks of the requested page from the storage node based on the physical storage location of the one or more component blocks; and returning the requested page.

In any of the preceding embodiments, the one or more component blocks of the requested page comprise at least two component blocks, and returning the requested page comprises reconstructing, by the page reader, the requested page from the at least two retrieved component blocks.

In any of the preceding embodiments, the method further comprises: sending the reconstructed page to the storage node for appending to the append-only storage log of the storage node.

In any of the preceding embodiments, the at least two component blocks are retrieved in parallel from the storage node.

In any of the preceding embodiments, the component blocks include one or more of a complete page and a page delta.

In any of the preceding embodiments, the storage node is remote from the database node.

In any of the preceding embodiments, the storage node is local to the database node.

In any of the preceding embodiments, the method further comprises: collecting at least one live data block from a segment of the append-only storage log in the storage node; and sending the at least one live data block to the storage node for appending to an end of the append-only storage log.

In any of the preceding embodiments, the at least one live data block comprises at least two live data blocks, and sending the at least one live data block to the storage node for appending comprises reconstructing a live page from the at least two live data blocks and sending the reconstructed live page to the storage node.

In any of the preceding embodiments, the method further comprises: instructing the storage node to clear the segment of the append-only storage log on the storage node.

These figures depict aspects of example embodiments for illustrative purposes.

DETAILED DESCRIPTION

As mentioned above, the "update-in-place" process works particularly well with HDDs because HDDs can locate and overwrite a data block with new data relatively easily. However, append-only storage devices, such as SSDs do not operate in the same manner as HDDs. Append-only storage devices typically cannot overwrite data in the same physical block without first performing a number of operations to erase that physical block prior to writing new data.

When data is modified in an append-only storage device, the append-only storage device does not typically overwrite the data in the same physical location as the previous data, and instead writes the modified data to an already empty block or page. The previous version of the data is then marked for deletion and ultimately removed through a process known as "garbage collection". Garbage collection may occur at varying intervals during normal operation of an append-only storage device.

The space occupied by obsolete data blocks that are found during garbage collection is erased (cleared) before the space can be reused. The storage media used in SSDs has a limited lifespan in terms of erase cycles, and so the use of the update-in-place process may shorten the lifetime of an append-only storage device, such as an SSD. Moreover, the update-in-place process is inefficient on append-only storage devices because frequent random writes are required (as opposed to sequential writes, which achieve higher performance in append-only storage device, such as SSDs).

In view of the above, the conventional "update-in-place" process used by conventional database management systems is not well-suited for use with modern append-only storage devices, such as SSDs. The present disclosure provides an apparatus and method for interfacing instructions between a database management layer and append-only physical storage devices in a storage layer.

Figure 1:
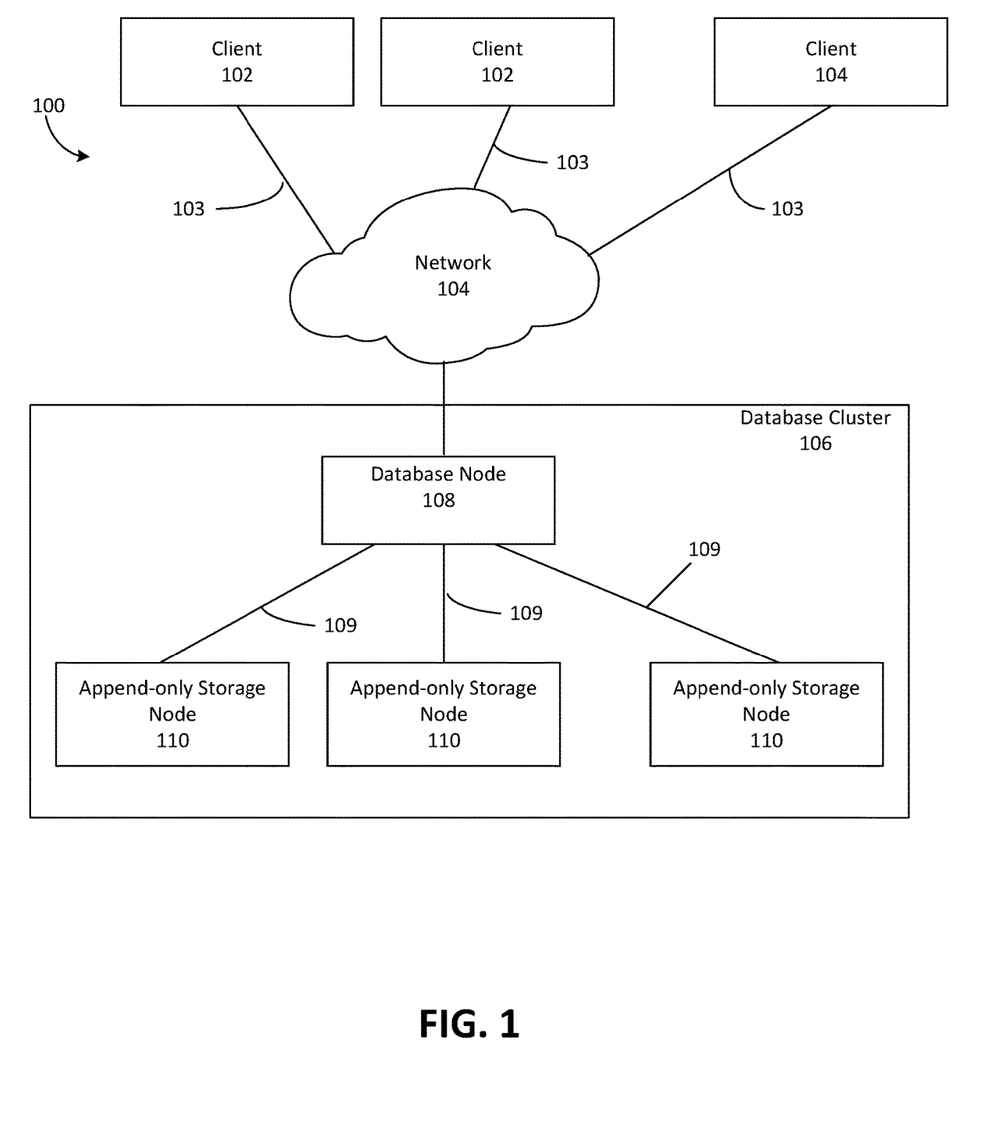
FIG. 1 is a block diagram depicting an example database system.

FIG. 1 is a block diagram depicting components of an example database system 100. In the example database system 100, one or more client devices 102 can connect to a database cluster 106 via communications network 104 and communication link 103. Database cluster 106 implements a database service and includes a database node 108 operable to store and retrieve data from append-only storage nodes 110 via data links 109. Although FIG. 1 depicts append-only storage nodes 110 as being remote from database node 108, it is contemplated that in some embodiments, the database node 108 includes local append-only storage devices. The communication link 103 may be wired or wireless, and may use any acceptable protocol for sending data to database node 108 via communications network 104. As depicted, database node includes 3 append-only storage nodes 110. It should be appreciated that embodiments are contemplated in which there are fewer than or more than 3 append-only storage nodes 110. Append-only storage nodes 110 may include, for example, SSD storage devices.

Figure 2:
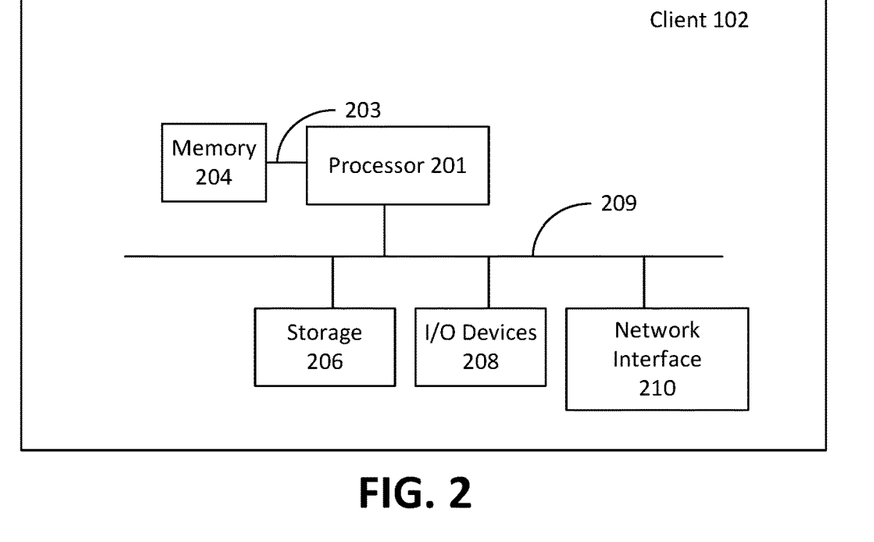
FIG. 2 is a block diagram depicting components of an example client device.

FIG. 2 is a block diagram depicting components of an example client 102. Client 102 may be any suitable computing device, such as a desktop computer, a laptop computer, a tablet, a smartphone, and the like. Client 102 includes one or more processors 201 that control the overall operation of the client 102. The processor 201 interacts with memory 204 via a memory bus 203, and interacts with storage 206, I/O devices 208, and network interface 210 via a bus 209. Bus 209 may be one or more of any type of several buses, including a peripheral bus, a video bus, and the like.

Each processor 201 may be any suitable type of processor, such as a central processing unit (CPU) implementing for example an ARM or x86 instruction set, and may further include specialized processors such as a Graphics Processing Unit (GPU) or other such processors. Memory 204 includes any suitable type of system memory that is readable by processor 201, such as static random access memory (SRAM), dynamic random access memory (DRAM), synchronous DRAM (SDRAM), read-only memory (ROM), or a combination thereof. In an embodiment, memory 201 may include more than one type of memory, such as ROM for use at boot-up, and DRAM for program and data storage for use while executing programs. Storage 206 may comprise any suitable non-transitory storage device configured to store data, programs, and other information and to make the data, programs, and other information accessible via bus 209. Storage 206 may comprises, for example, one or more of a solid state drive, a hard disk drive, a magnetic disk drive, an optical disk drive, a secure digital (SD) memory card, and the like.

I/O devices 208 include, for example, user interface devices such as a display device, including a touch-sensitive display device capable of displaying rendered images as output and receiving input in the form of touches. In some embodiments, I/O devices 208 additionally or alternatively include one or more of speakers, microphones, cameras, sensors such as accelerometers and global positioning system (GPS) receivers, keypads, or the like. In some embodiments, I/O devices 208 include ports for connecting client 102 to other client devices. In an example embodiment, I/O devices 208 include a universal serial bus (USB) controller for connection to peripherals or to host computing devices.

Network interface 210 is capable of connecting client 102 to communications network 104. In some embodiments, network interface 210 includes one or more of wired interfaces (e.g. wired Ethernet) and wireless radios, such as WiFi, Bluetooth, or cellular (e.g. GPRS, GSM, EDGE, CDMA, LTE, or the like). Network interface 210 enables the client 102 to communicate with database cluster 106 via communications network 104 and communication link 103. Network interface 210 can also be used to establish virtual network interfaces, such as a Virtual Private Network (VPN).

Figure 3:
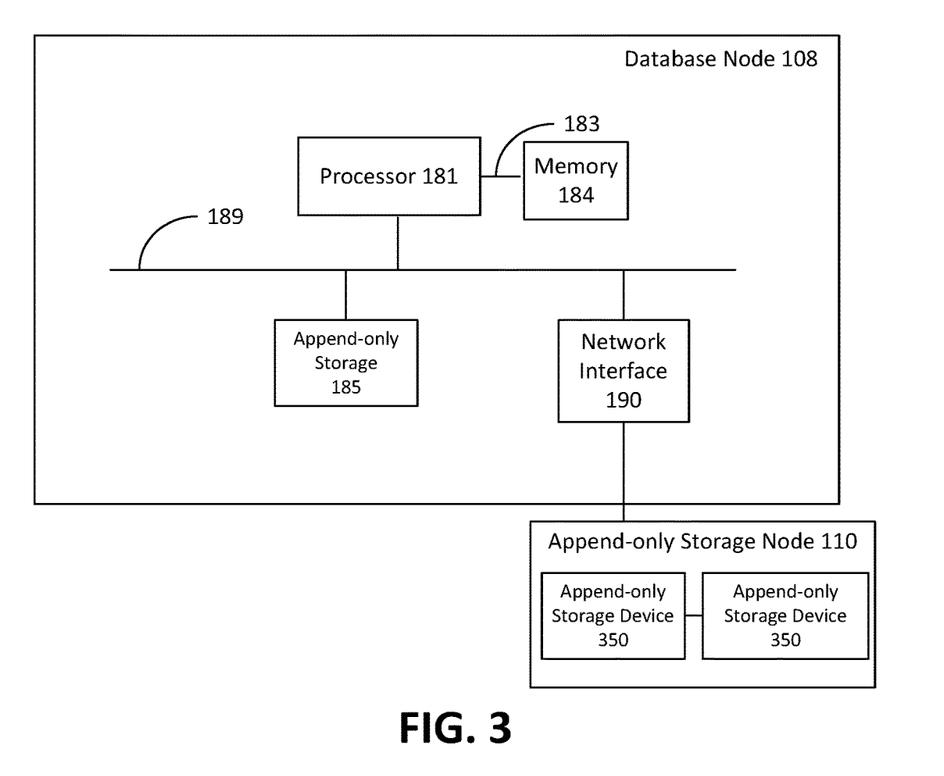
FIG. 3 is a block diagram depicting components of an example database node.

FIG. 3 is a block diagram depicting components of an example database node 108. As described herein, database node 108 includes a combination of hardware devices and software executing in the memory of the hardware devices. Hardware devices of database node 108 include one or more processors 181, memory 184, and network interface 190. The one or more processors 181 interact with memory 184 via a memory bus 183, and interact with network interface 190 via a bus 189. As depicted, hardware devices of database node 108 may, in some embodiments, include append-only storage 185. Local append-only storage 185 may include any number of suitable append-only storage devices, such as flash based SSDs. Those skilled in the art will appreciate that database node 108 may additionally include conventional storage elements such as hard disk drives in place of, or in addition to append-only storage 185.

As depicted in FIG. 3 append-only storage node 110 is located external to database node 108 and database node 108 can communicate with append-only storage node 110 via network interface 190. Append-only storage node 110 includes a combination of hardware devices and software executing in memory of the hardware devices. Hardware devices of append-only storage node 110 may include one or more processors, a memory, a network interface, and one or more append-only storage devices 350 (generally referred to hereinafter as append-only storage device 350 and collectively referred to as append-only storage devices 185). Each append-only storage device 350 may be any suitable append-only storage devices, such as an SSD. In some embodiments, append-only storage node 110 may include conventional storage elements such as hard disk drives in addition to the append only storage device 350. It will be understood that the presence of a conventional storage element may not be apparent to the database node 108 (or to any node outside append only storage node 110), and the presence of a conventional storage element does not necessarily change how the database node 108 interacts with the append-only storage node 110 for the purposes of storing data in an append-only storage device 350.

Figure 4:
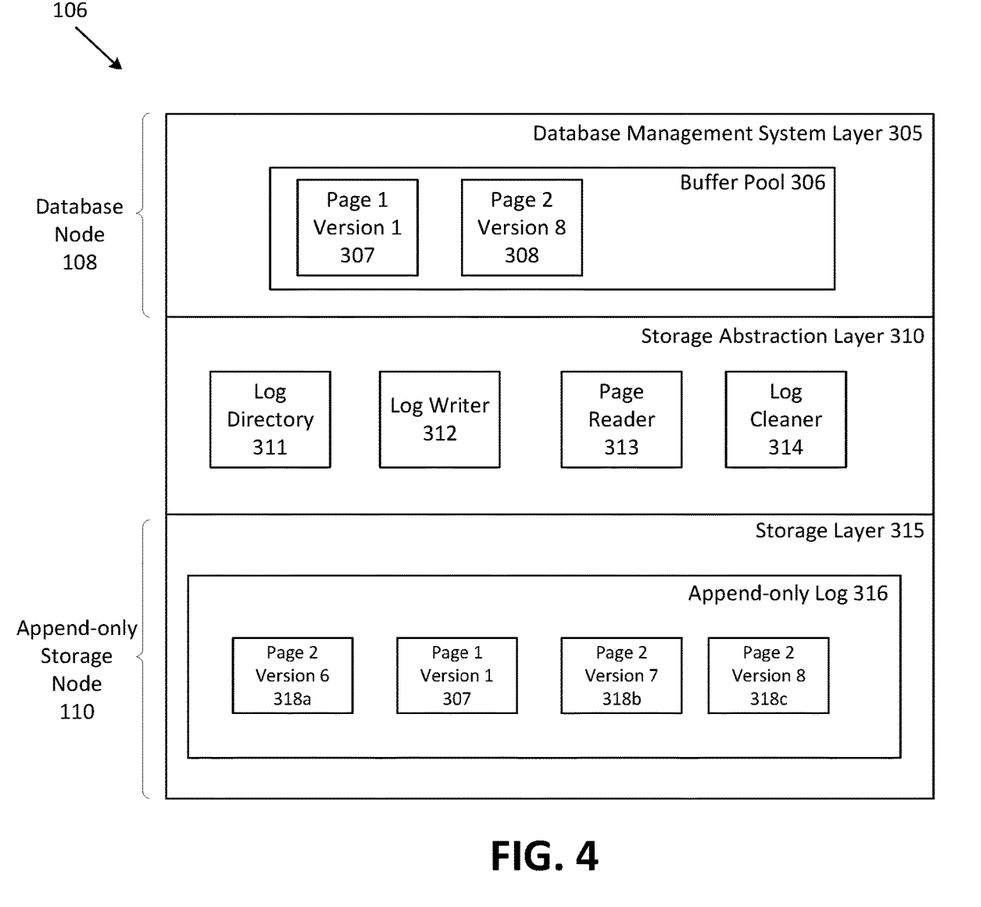
FIG. 4 is a depiction of layers executing on a database node and an append-only storage node.

FIG. 4 is an expanded view depicting a logical representation of components of database cluster 106 of FIG. 1. Database cluster 106 is a platform that provides a database service and includes a database management system (DBMS) layer 305, a storage abstraction layer 310, and a storage layer 315. DMBS layer 305 may be provided through the execution of software, such as processor-executable instructions, by the one or more processors 181 of the database node 108. Upon execution of the software, database node 108 is configured to act as DMBS layer 305 (or a constituent part of the layer). Storage layer 315 is a representation of a storage function. In one embodiment it is provided as software, such as processor-executable instructions, which when executed by the one or more processors of append-only storage nodes 110 configures the append-only storage nodes 110 of FIG. 1 to act a storage layer 315 (or a constituent part of the layer). In some embodiments, storage layer 315 also controls the operation of local append-only storage devices 185 when database node 108 includes local append-only storage 185. Storage abstraction layer 310 is an interface between the DMBS layer 305 and storage layer 315. Storage abstraction layer 310 can, in some embodiments, be implemented as software, such as processor-executable instructions, that when executed by a processor in a computing platform configures the resources of the platform to receive requests including read page requests, write page requests, and write page delta requests from DBMS layer 305, and convert or translate these requests into instructions that enable storage layer 315 to store data on physical append-only storage devices 350 of append-only storage nodes 110, retrieve data from physical storage devices of append-only storage nodes 110, or modify data on physical storage devices of append-only storage nodes 110. Storage abstraction layer 310 can be configured to serve the requests received from DBMS layer 305 while ensuring durability of data stored on the append-only physical storage devices of storage layer 315 as described in further detail below. In some embodiments, processor-executable instructions of storage abstraction layer 310 are loaded into memory and executed by one or more processors of an apparatus. In some embodiments, storage abstraction layer 310 may be integrated into database node 108, as described in further detail below. In some embodiments, storage abstraction layer 310 can be integrated into append-only storage nodes 110, as described in further detail below. Although it may introduce possible redundancies, storage abstraction layer 310 may be integrated into each of the DBMS layer 305 and the storage layer 315. In embodiments where the storage abstraction layer is integrated into the node or resources providing the functionality of a different layer, processing resources associated with the layer within which the storage abstraction layer is integrated can be used to execute software which configures the resources to act as the storage abstraction layer.

Those skilled in the art will appreciate that in data centers, such as database cluster 106, virtualization may be used to provide a virtual hardware platform upon which software can be executed. From the perspective of the software being executed, the virtualized hardware is no different than physical hardware. Virtualization may be carried out in a number of different ways, and may result in a single virtualized hardware platform being created upon the resources of a plurality of different physical database nodes and append-only storage nodes. Similarly, a plurality of different virtual hardware platforms may be created on a single physical database node 108, append-only storage node 110, or both.

As depicted in FIG. 4, DBMS layer 305 provides the capability to issue a "read page" request and a "write page delta" request. In some embodiments, the DBMS layer 305 is implemented using SQL Server, DB2, MySQL, PostgreSQL, Oracle, SQLite, or the like. DBMS layer 305 includes a buffer pool 306 (also referred to as a buffer cache). The buffer pool 306 contains database pages. DBMS layer 305 is operable to request a page from the storage layer 315 (a "read page" request) and to write a new page in the storage layer 315 (a "write page" request) or modify an existing page in the storage layer 315 (a "write page delta" request). As described herein, a page delta is a modification to a page which is encoded as changes from the previous version of the page in the append-only log 316. Page deltas can be appended to the append-only log 316.

As depicted, the buffer pool 306 contains a first version of a first page for storage (depicted as page 1 version 1 307) and an 8th version of a second page (depicted as page 2 version 8 308).

Storage layer 315 includes an append-only log 316 which contains complete images of component blocks of a page (typically a recent version of a page) and may also contain subsequent deltas for that page. As depicted, append-only log 316 contains a complete image of a first page (depicted as page 1 version 1 307), as well as a complete image of a $6^{th}$ version of a second page (depicted as page 2 version 6 318a), a delta which includes subsequent changes to the $6^{th}$ version of the second page (depicted as page 2 version 7 318b), and a delta which includes subsequent changes to the $7^{th}$ version of the second page (depicted as page 2 version 8 318c). In some embodiments, blocks 318a, 318b and 318c are stored on sequential blocks in an append-only storage device 350 on append-only storage node 110. As depicted in FIG. 4, blocks 318b and 318c are stored in sequential blocks.

As depicted in FIG. 4, storage abstraction layer 310 includes log directory 311, log writer 312, page reader 313, and log cleaner 314. It should be appreciated that the log cleaner 314 is an optional component and in some embodiments storage abstraction layer 310 does not include log cleaner 314.

Storage abstraction layer 310 uses log directory 311 to associate a logical identifier with physical locations of component blocks. Log directory 311 contains data tracking the location of full pages and page deltas (referred to herein collectively as "component blocks" of a page) on physical append-only storage devices in storage nodes 110. In some embodiments, the log directory contains data indicative of which append-only storage node 110 stores the page, as well as which particular append-only storage device in that append-only storage node 110 stores the page. For example, as depicted in FIG. 4, log directory 311 stores the physical location of each component block of pages 1 and 2 (page 1 version 1 307, page 2 version 6 318a, page 2 version 7 318b, and page 2 version 8 318c) in append-only log 316.

Storage abstraction layer 310 uses log writer 312 to append component blocks to append-only log 316. Log writer 312 is operable to receive a "write page" request and instruct storage layer 315 to append a new component block (i.e. a page or a page delta) or group of component blocks to append-only log 316 of storage layer 315. When storage abstraction layer 310 receives a write request from DBMS layer 305, storage abstraction layer 310 associates a logical identifier with the component block and records the logical identifier in log directory 311. The component block is sent to storage layer 315 which appends the component block to the append-only log 316. Once appended, storage layer 315 returns or sends an identifier of the physical location of the component block which has been appended. Storage abstraction layer 310 then associates the received identifier of the physical location of the component block with the logical identifier in the log directory 311. In some embodiments, the component blocks appended to append-only log 316 are appended to sequential storage blocks in the physical storage device.

Page reader 313 is operable to reconstruct a requested version of a page based on a complete page and any subsequent page deltas stored in append-only log 316. In some embodiments, storage abstraction layer 310 includes log cleaner 314. Log cleaner 314 is operable to construct consolidated versions of pages based on component blocks, and then discard obsolete data and instruct storage layer 315 to consolidate append-only log 316. Log cleaner 314 may also copy component blocks to the front of the log without consolidating component blocks.

DBMS layer 305 is unaware of the implementation details of storage layer 315 and physical storage devices 350 of append-only storage nodes 110. Storage abstraction layer 310 acts as an interface between DMBS layer 305 and storage layer 315, so as to convert or translate page read and page write requests into instructions that cause storage layer 315 to perform operations to append a component block or component blocks to append-only storage devices 350, and to read a component block or component blocks from append-only physical storage devices 350.

Figure 5:
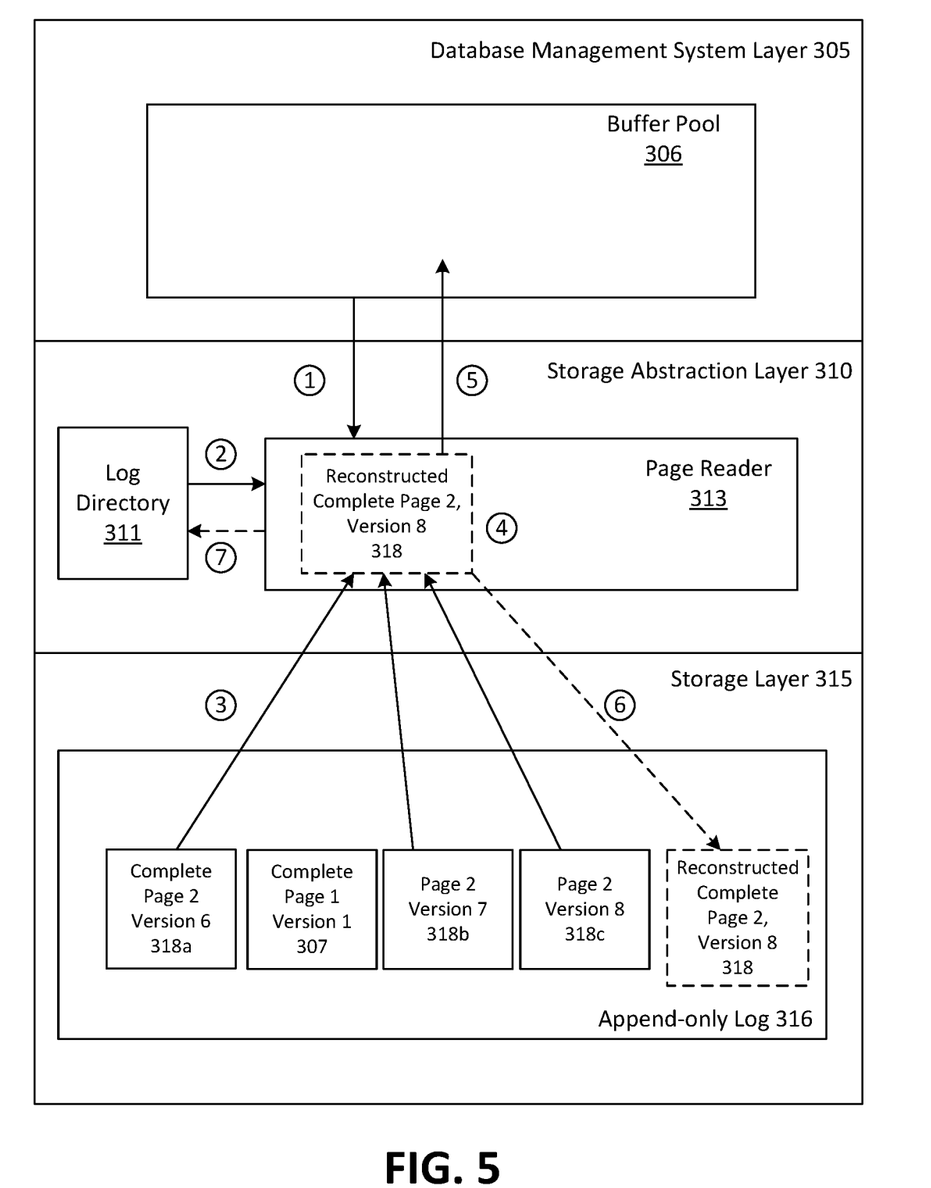
FIG. 5 is an expanded view depicting a logical representation of components of database cluster of FIG. 1.

FIG. 5 is a block diagram depicting the operation of the page reader component 313 in storage abstraction layer 310. A read operation is initiated when storage abstraction layer 310 receives a page read request from DBMS layer 305. In this example, the page read request is for the most current version of page 2. When a page read request is received by page reader 313 of storage abstraction layer 310, the page reader 313 determines the logical identifier of the requested page and looks up the physical location of each component block of the requested page in the log directory 311. In some embodiments, the physical location of each block includes an identifier indicative of append-only storage node 110 storing the requested block, and an identifier indicative of the append-only storage device 350, 352 which stores the block. In this example, the requested page component blocks include complete version 6 318a, and deltas 318b and 318c. Upon receiving the location of each page and delta from log directory 311, storage abstraction layer 310 interacts with storage layer 315 which retrieves each of the pages and deltas from append-only log 316 in storage layer 315 and sends each of the retrieved page and deltas to storage abstraction layer 310. In some embodiments, the retrieved page and deltas are retrieved in parallel.

Once received, page reader 313 reconstructs page 2 starting from the most recent complete version (318a) of the requested page and then by processing subsequent deltas 318b and 318c, which results in the creation of a reconstructed complete version of page 2, version 8 318. The reconstructed page 318 is then sent to the buffer pool 306 of DBMS layer 305, where the page is available to be read or modified, for example, by client device 102.

In some embodiments, storage abstraction layer 310 may interact with storage layer 315 to append the reconstructed complete version of page 2, version 8 318 to append-only log 316 using log writer 312. If complete page 2, version 8 318 is appended to the append-only log 316, the page reader 313 will also provide an update to log directory 311 which includes the physical storage location of the newly appended page 318. A person skilled in the art will appreciate that the addition of a complete version of page 2, version 8 318 will result in the previously logged component blocks 318a, 318b and 318c being redundant.

Accordingly, the appending of reconstructed complete page 2, version 8 318 to the append-only log 316 allows for a log clearing mechanism to remove the redundant component blocks 318a, 318b and 318c from the append-only log 316, thus clearing up space in the log 316. Moreover, it should be noted that writing a complete version of page 2, version 8 318 may obviate the need for reconstruction of page 2 version 8 using the previous component blocks 318a, 318b, 318c, which may result in more efficient subsequent read operations for that page.

Figure 6:
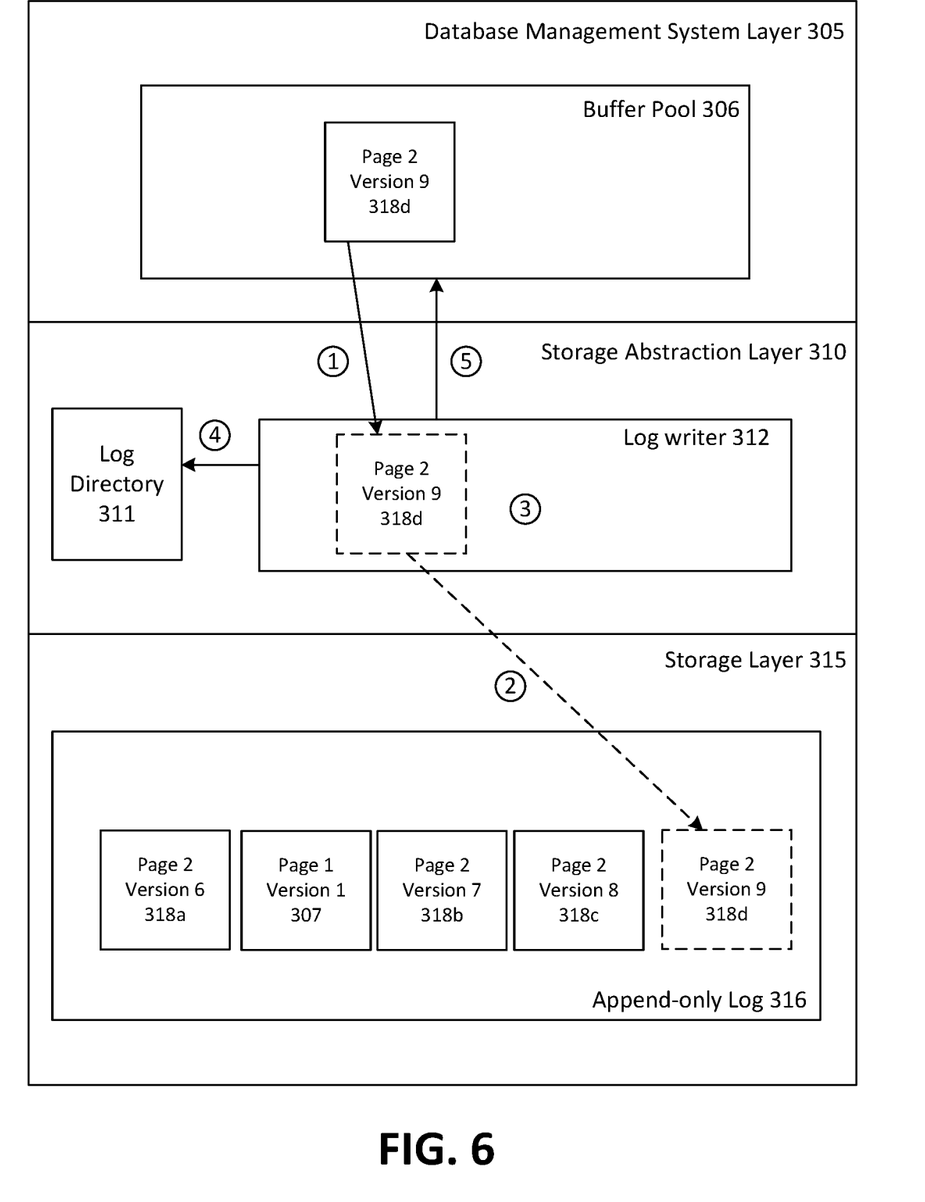
FIG. 6 is a block diagram depicting the operation of the log writer component.

As noted above, component blocks (complete pages and page deltas) may be written or appended to append-only log 316 in storage layer 315. FIG. 6 is a block diagram depicting an example operation of the log writer 312, which interacts with storage layer 315 to perform write/append operations. The appending process begins when the storage abstraction layer 310 receives a page write request from DBMS layer 305. The page write request may include a log buffer with page deltas created by DBMS layer 305. In this example, DBMS layer 305 sends a page write request which includes a delta of page 2 (version 9 318d). As depicted, the write request includes only one page delta for the purposes of simplicity. It should be noted embodiments in which the page write request includes a plurality of page deltas for entry into append-only log 316 of storage layer 315 are contemplated.

For each component block in the log buffer, the log writer 312 parses the contents of the component block to determine the logical identifier in log directory 311 to which each component block applies. If there is no corresponding log entry in log directory 311 for a component block, then a new entry is created in log directory 311 using the logical identifier for that component block. The log writer 312 then sends an instruction to storage layer 315 to append the delta of page 2, version 9 318d to the append-only log 316. It should be noted that in embodiments in which a plurality of deltas are being appended, the plurality of deltas may be written sequentially to append-only log 316.

After writing the delta 318d to append-only log 316, the log writer 312 receives a an identifier from storage layer 315 indicative of the physical location of the page delta 318d. The identifier indicative of the physical location of delta 318d is then associated with the logical identifier for the component block in log directory 311.

Upon successfully writing delta 318d to the append-only log 316 and storing the location in log directory 311, the storage abstraction layer 310 sends or returns a response to DBMS layer 305 indicating that the write operation was successful.

Figure 7:
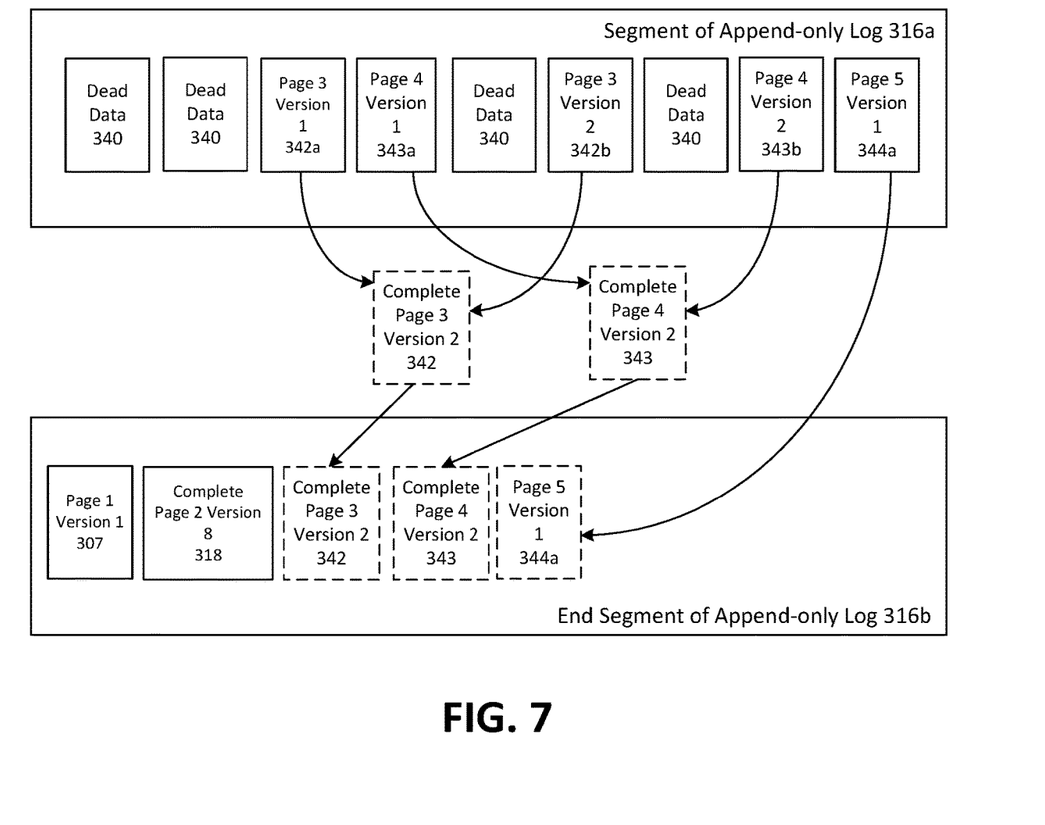
FIG. 7 is a block diagram depicting the operation of the log cleaner component.

In some embodiments, storage abstraction layer 310 includes log cleaner 314. The log cleaner 314 is operable to interact with storage layer 315 to clean or consolidate one or more segments of the append-only log 316 of storage layer 315. In some embodiments, the log cleaner 314 consolidates the append-only log 316 periodically. In some embodiments, the log cleaner 314 consolidates the append-only log 316 according to a policy. For example, one policy may be that the oldest segment in append-only log 316 may be targeted for consolidation. Another policy may be that the segment of append-only log 316 which contains the least "live" data may be targeted for consolidation. As described herein, live data refers to data which is involved or could be potentially required by an active transaction in the DBMS layer 305.

Once a segment 316a of append-only log 316 has been chosen for consolidation, the log cleaner 314 consults the log directory 311 to determine whether a component block (page or delta) in the log segment 316a can be discarded. For example, referring to FIG. 5, the append-only log 316 contains several obsolete component blocks relating to page 2 (i.e. blocks 318a, 318b, and 318c) as well as a reconstructed complete version of page 2 version 8 (i.e. block 318). In such a situation, redundant blocks 318a, 318b and 318c can be discarded without losing any useful data because the useful data remains in reconstructed complete block 318.

As depicted in FIG. 7, the end segment of append-only log 316b of storage layer 315 includes the most recently written blocks to append-only log 316, which are page 1 version 1 (block 307) and reconstructed page 2 version 8 (block 318). In the example of FIG. 7, segment 316a of append-only log 316 has been selected for consolidation by log cleaner 314 of storage abstraction layer 310. As depicted, the segment 316a contains numerous instances of dead data 340 which occupy space in the segment 316a. A component block is considered dead if it is no longer needed by any active or any future transaction. Segment 316a also contains blocks relating to page 3 (i.e. blocks 342a and 342b), page 4 (i.e. blocks 343a and 343b), and page 5 (i.e. block 344a).

For page 3, blocks 342a and 342b can be used to reconstruct a current version of page 3 (denoted as complete page 3, version 2 342), which is then appended to the end segment 316b of append-only log 316. For page 4, a similar process is undertaken to append a reconstructed complete version of page 4, version 2 343 to the end segment 316b of append-only log 316. For page 5, there is only one block 344a, and so block 344a can be appended to the end segment 316b of append-only log 316. It should be appreciated that the log directory 311 is updated to reflect the physical locations of the newly written blocks 342, 343 and 344a for each of pages 3, 4 and 5, as noted above.

Once each of blocks 342, 343 and 344a has been appended to the end of append-only log 316, the selected segment 316a of the append-only log 316 will have become redundant, as each of the blocks in segment 316a represent dead data or blocks made redundant by blocks 342, 343 and 344a at the end segment 316b of append-only log 316. As such, storage abstraction layer 315 discards the segment 316a of append-only log 316 and informs storage layer 315 that the segment 316a is no longer needed, which allows storage layer 315 to use the segment 316a for storing other data. Log cleaner 314 may be useful in that the append-only log 316 can be compacted and consolidated by removing obsolete and redundant data blocks. The consolidation of the log may allow for more efficient use of append-only storage nodes 110, as well as faster retrieval of pages from database cluster 106 (as the overhead processing required to reconstruct pages from multiple blocks in append-only log 316 may be reduced or avoided).

One of the benefits of the distributed computing system 100 is flexibility in terms of the possible implementation configurations for a database. For example, storage abstraction layer 310 can be implemented in a fully centralized manner, and can also be implemented in a distributed manner.

Figure 8:
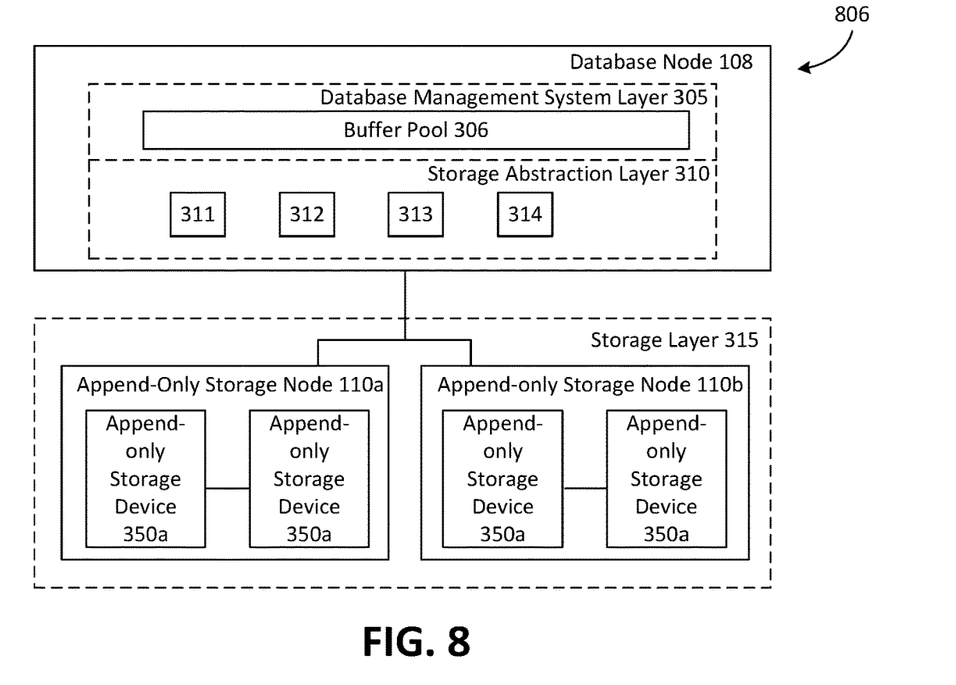
FIG. 8 is a block diagram depicting an example database cluster that provides a service having a centralized storage abstraction layer.

FIG. 8 is a block diagram depicting an example a database cluster 806 that provides a database service having a centralized storage abstraction layer 310. As depicted, storage abstraction layer 310 is integrated entirely into database node 108. Storage layer 315 may be integrated into local append-only storage, remote append-only storage nodes 110a, 110b, or any combination thereof. As depicted in FIG. 8, storage layer 315 includes a plurality of append-only storage nodes 110a, 110b which are remote from database node 108.

The example embodiment shown in FIG. 8 offers a number of advantages. For example, with storage abstraction layer 310 being separate from the various append-only storage nodes 110a, 110b and append-only storage devices 350a, 350b, there are relatively few requirements for an append-only storage device 350a, 350b to be used with the database cluster 806. Append-only storage devices 350a, 350b are capable of servicing sequential write and random read requests. The remaining functions of converting a page read or page write request from DBMS layer 305 to a log-based operation are all handled by storage abstraction layer 310 on the database node 108, and therefore relatively little customization would be required for append-only storage nodes 110a, 110b. However, in the configuration shown in FIG. 8, if the append-only storage nodes 110a, 110b are located remotely from database node 108, there may be high network traffic involved in maintaining the database, as all read and write operations would occur via a network connection, and the reconstruction of a page would require each block of the page to be sent to the storage abstraction layer 310 from the storage layer 315 via the network connection.

Figure 9:
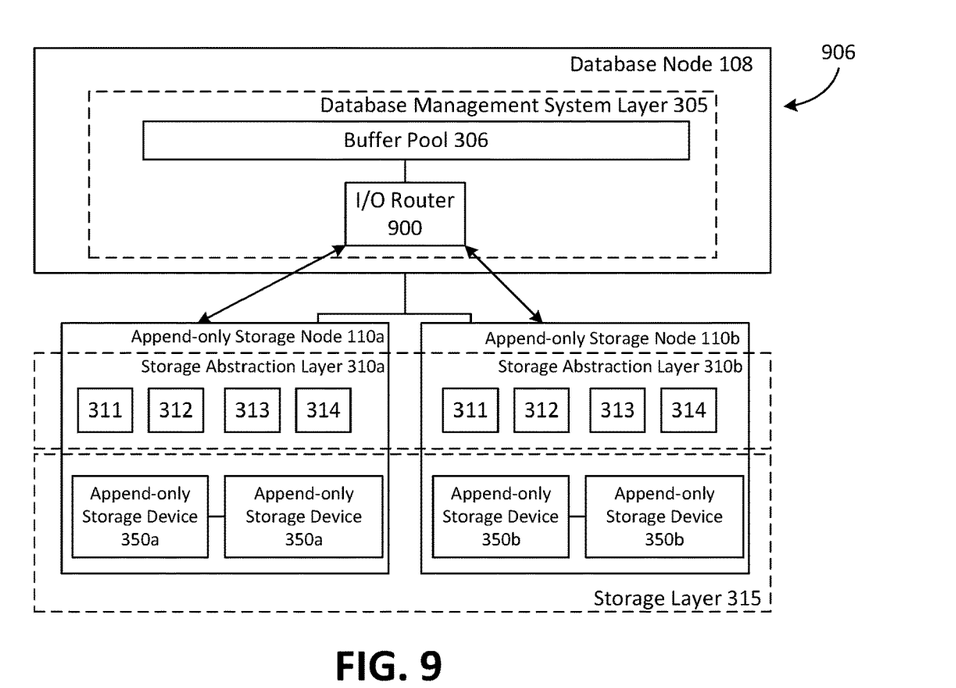
FIG. 9 is a block diagram depicting an example database cluster that provides a service having a distributed storage abstraction layer.

FIG. 9 is a block diagram depicting an example database cluster 906 that provides a database service having a distributed deployment of the storage abstraction layer 310. As depicted, database cluster 906 is sharded (or partitioned) across several append-only storage nodes 110a, 110b. I/O router 900 maintains a mapping of which storage node 110a, 110b stores each page in the database. I/O router 900 is operable to receive a page read or page write request, and forward the request to the storage abstraction layer 310a or 310b on the appropriate storage node 110a, 110b. It should be noted that in both FIGS. 8 and 9, the presence of log cleaner 314 is optional.

As depicted in FIG. 9, each storage node 110a, 110b includes a localized storage abstraction layer 310a and 310b which manages only the pages stored in its respective append-only storage devices 350a, 350b. To execute a page read request from DBMS layer 305, the buffer pool 306 issues a page read request for a particular page, and I/O router 900 looks up the page identifier in the request and determines which append-only storage node 110a, 110b (or shard) stores the requested page. In this example, the requested page is stored on append-only storage node 110a. The I/O router 900 then issues the page read request to append-only storage node 110a, and the storage abstraction layer 310a handles the page read request in accordance with the processes described above.

A technical advantage of the configuration of FIG. 9 is that scaling is relatively straightforward. For example, additional append-only storage nodes 110 can be added to the system of FIG. 9 with a relatively small increase in system complexity and little impact on network traffic. Because the reconstruction of a requested page occurs locally within a particular append-only storage node 110, rather than at the database node 108, the network connection would incur less traffic relative to the configuration in FIG. 8. Moreover, the configuration of FIG. 9 reduces the processing load on database node 108 and offloads that processing load to an append-only storage node 110 which is more likely to have processing capabilities to accommodate larger volumes of requests.

In some embodiments, storage abstraction layer 310 transparently converts operations from the legacy database systems that use update-in-place processes to store data on physical storage devices of storage nodes, to operations tailored for modern append-only storage nodes (such as storage nodes that include SSDs). As noted above, append-only storage nodes are being increasingly used in storage nodes of datacenters. Update-in-place processes write an updated page to a "clean" storage block on the append-only storage device, and then clear old versions of the page during garbage collection. Given that append-only storage devices have a limited number of write cycles, using update-in-place processes may shorten the life of an append-only storage device of a storage node or shorten the life of particular blocks in an append-only storage device of a storage node.

According to the append-only writing operation of some embodiments of the present invention, each new page or page delta is appended to the next available block in an append-only log 316. Therefore, a technical advantage of the systems described herein is that each new page or page delta is written sequentially to the append-only log 316, which is faster and more efficient for an append-only storage device 350 than random writes. Moreover, sequential writing may extend the life of an append-only storage device 350 compared to the random writes from an update-in-place process, thereby reducing the cost of operating a database, as the time required for replacing components may be extended. Furthermore, append-only storage devices 350 can perform "random read" operations (i.e. read operations from non-sequential storage blocks) quite quickly relative to HDDs, which allows the data retrieval required for page read operations to be done faster with append-only storage devices 350 than with HDDs.

Moreover, as exemplified by the example embodiments described herein, the systems described herein may be relatively easily adapted to different storage layer implementations, different database systems, sharded or non-sharded databases, and can be scaled relatively easily in storage size without upfront resource reservations.

Because the DMBS layer 305 is isolated from storage layer 315, the systems described herein allow for greater flexibility in terms of how data is physically stored. For example, any combination of locally attached append-only storage devices 350, cloud storage, or customized storage nodes can be used. Moreover, data can be partitioned or sharded across multiple append-only storage nodes 110. Furthermore, the embodiments described herein may support multiple database systems, including but not limited to MySQL, PostgreSQL, and the like.

Moreover, in some embodiments, the storage abstraction layer 310 is used with other types of databases, such as key value store databases. In embodiments using key value store databases, the storage abstraction layer 310 may receive read and write record requests from DMBS 305, and the storage abstraction layer 310 converts the read and write record requests to append and read component instructions, which are sent to storage layer 315.

Moreover, the embodiments disclosed herein are compatible with various replication schemes. In some embodiments, storage abstraction layer 310 controls replication. For example, the storage abstraction layer 310 can handle replication by sending each page write request to multiple append-only storage nodes 110. In some embodiments the replication may be implemented by storage layer 315. The embodiments disclosed herein can support consistent (all copies of component block must be written for a write operation to be considered complete) and quorum-based (a threshold number of copies of a component block must be written for a write operation to be considered complete) replication schemes.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods, or steps.

As can be understood, the detailed embodiments described above and illustrated are intended to be examples only. Variations, alternative configurations, alternative components and modifications may be made to these example embodiments. The invention is defined by the claims.

What is claimed is:

1. An apparatus comprising:
   one or more processors;
   a memory storing processor-executable instructions that, when executed by the one or more processors, cause the one or more processors to:
      receive a page write request relating to modifying one or more component blocks of a page, the page further including second one or more component blocks;
      determine, by a log writer, a logical identifier corresponding to the page in a log directory;
      send, by the log writer, each corresponding component block of the one or more component blocks to a storage node for appending to an append-only storage log of the storage node;
      receive, from the storage node, data indicative of a physical storage location of each component block of the one or more component blocks, the physical storage location being separate from a second physical storage location of the second one or more component blocks of the page; and
      associate, in the log directory, the physical storage location of each of the one or more component blocks with the logical identifier corresponding to the page.

2. The apparatus of claim 1, wherein the processor-executable instructions further cause the one or more processors to:
   receive a page read request relating to the page;
   determine, by the log directory, the physical storage location of the one or more component blocks of the page in the storage node;
   retrieve, by a page reader, the one or more component blocks of the page from the storage node based on the physical storage location of the one or more component blocks; and
   return the page.

3. The apparatus of claim 2, wherein the one or more component blocks of the page comprise at least two component blocks, and wherein returning the page comprises reconstructing, by the page reader, the page from the at least two component blocks.

4. The apparatus of claim 3, wherein the processor-executable instructions further cause the one or more processors to:
   send, by the log writer, the reconstructed page to the storage node for appending to the append-only storage log of the storage node.

5. The apparatus of claim 3, wherein the at least two component blocks are retrieved in parallel from the storage node.

6. The apparatus of claim 1, wherein the component blocks include one or more of a complete page and a page delta.

7. The apparatus of claim 1, wherein the storage node is remote from a database node.

8. The apparatus of claim 1, wherein the storage node is local to a database node.

9. The apparatus of claim 1, wherein the apparatus is integrated into one of a database node and the storage node.

10. The apparatus of claim 1, wherein the processor-executable instructions further cause the one or more processors to:
    collect, by a log cleaner, at least one live data block from a segment of the append-only storage log; and
    send the at least one live data block to the storage node for appending to an end of the append-only storage log.

11. The apparatus of claim 10, wherein the at least one live data block comprises at least two live data blocks, and wherein sending the at least one live data block to the storage node for appending comprises reconstructing a live page from the at least two live data blocks and sending the reconstructed live page to the storage node.

12. The apparatus of claim 10, wherein the processor-executable instructions further cause the one or more processors to:
    instruct the storage node to clear the segment of the append-only storage log.

13. A method comprising:
    receiving, at a database node, a page write request relating to modifying one or more component blocks of a page, the page further including second one or more component blocks;
    determining a logical identifier corresponding to the page in a log directory;
    sending each corresponding component block of the one or more component blocks to a storage node for appending to an append-only storage log of the storage node;
    receiving, from the storage node, data indicative of a physical storage location of each component block of the one or more component blocks, the physical storage location being separate from a second physical storage location of the second one or more component blocks of the page; and
    associating, in the log directory, the physical storage location of each of the one or more component blocks with the logical identifier corresponding to the page.

14. The method of claim 13, further comprising:
    responsive to receiving, at the database node, a page read request relating to the page:
       determining, by the log directory, the physical storage location of the one or more component blocks of the requested page in the storage node;
       retrieving the one or more component blocks of the requested page from the storage node based on the physical storage location of the one or more component blocks; and
       returning the page.

15. The method of claim 14, wherein the one or more component blocks of the page comprise at least two component blocks, and wherein returning the requested page comprises reconstructing, by a page reader, the page from the at least two component blocks.

16. The method of claim 15, further comprising:
sending the reconstructed page to the storage node for appending to the append-only storage log of the storage node.

17. The method of claim 15, wherein the at least two component blocks are retrieved in parallel from the storage node.

18. The method of claim 13, wherein the component blocks include one or more of a complete page and a page delta.

19. The method of claim 13, wherein the storage node is remote from the database node.

20. The method of claim 13, wherein the storage node is local to the database node.

21. The method of claim 13, further comprising:
collecting at least one live data block from a segment of the append-only storage log in the storage node; and
sending the at least one live data block to the storage node for appending to an end of the append-only storage log.

22. The method of claim 21, wherein the at least one live data block comprises at least two live data blocks, and wherein sending the at least one live data block to the storage node for appending comprises reconstructing a live page from the at least two live data blocks and sending the reconstructed live page to the storage node.

23. The method of claim 21, further comprising:
instructing the storage node to clear the segment of the append-only storage log on the storage node.

* * * * *